May 1, 1928.
R. GUILLERY
BRAKE
Filed Jan. 27, 1923
1,668,274
5 Sheets-Sheet 1
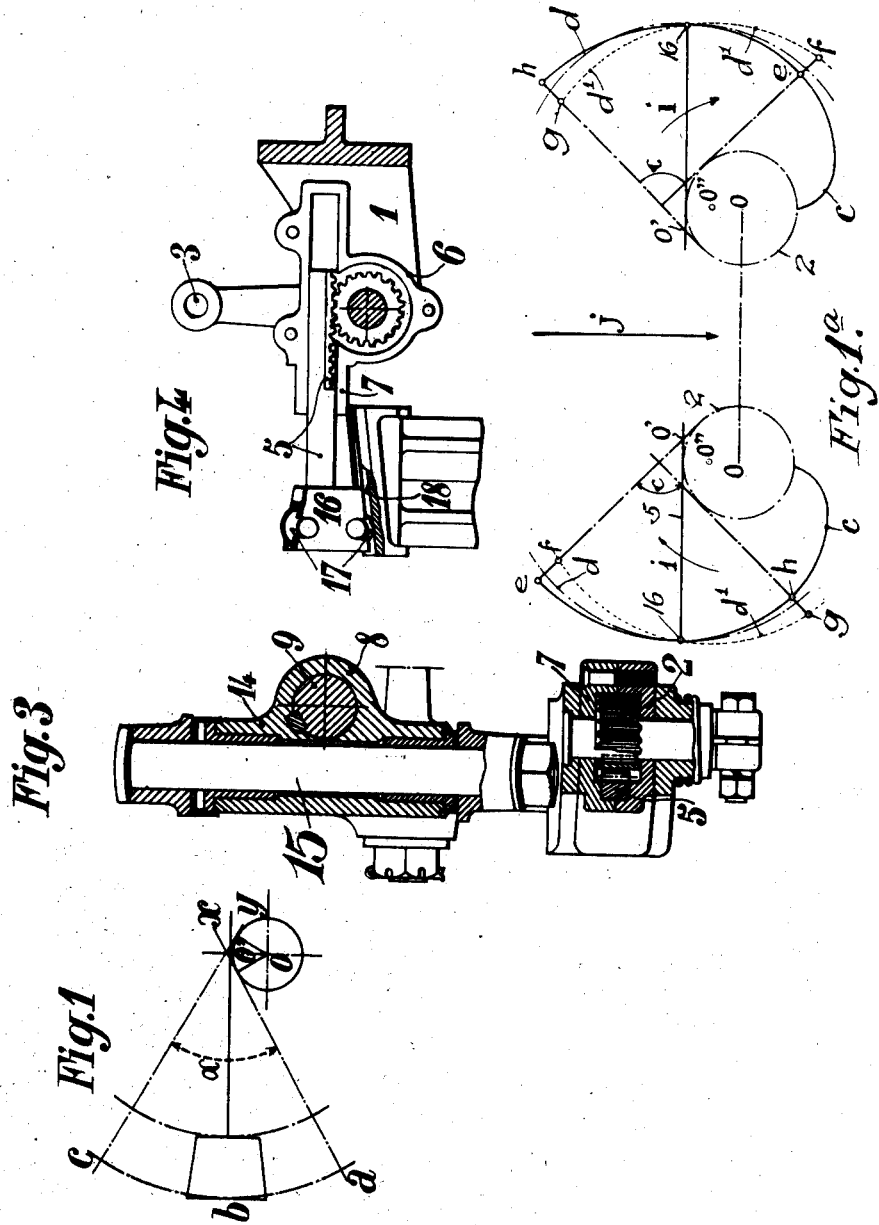
Inventor:
R. Guillery
By Marker Clark
Attys.

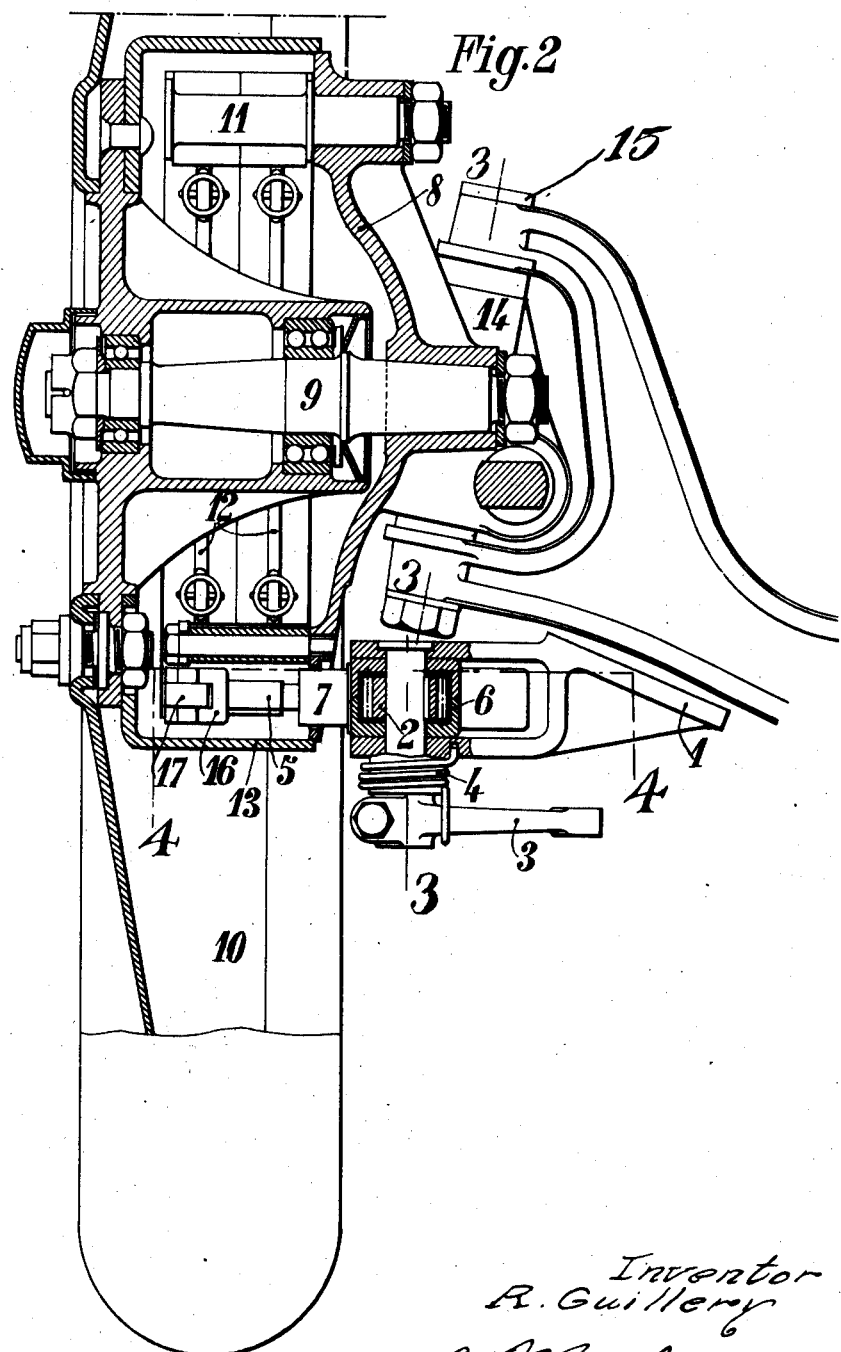

May 1, 1928.
R. GUILLERY
1,668,274
BRAKE
Filed Jan. 27, 1923 5 Sheets-Sheet 3
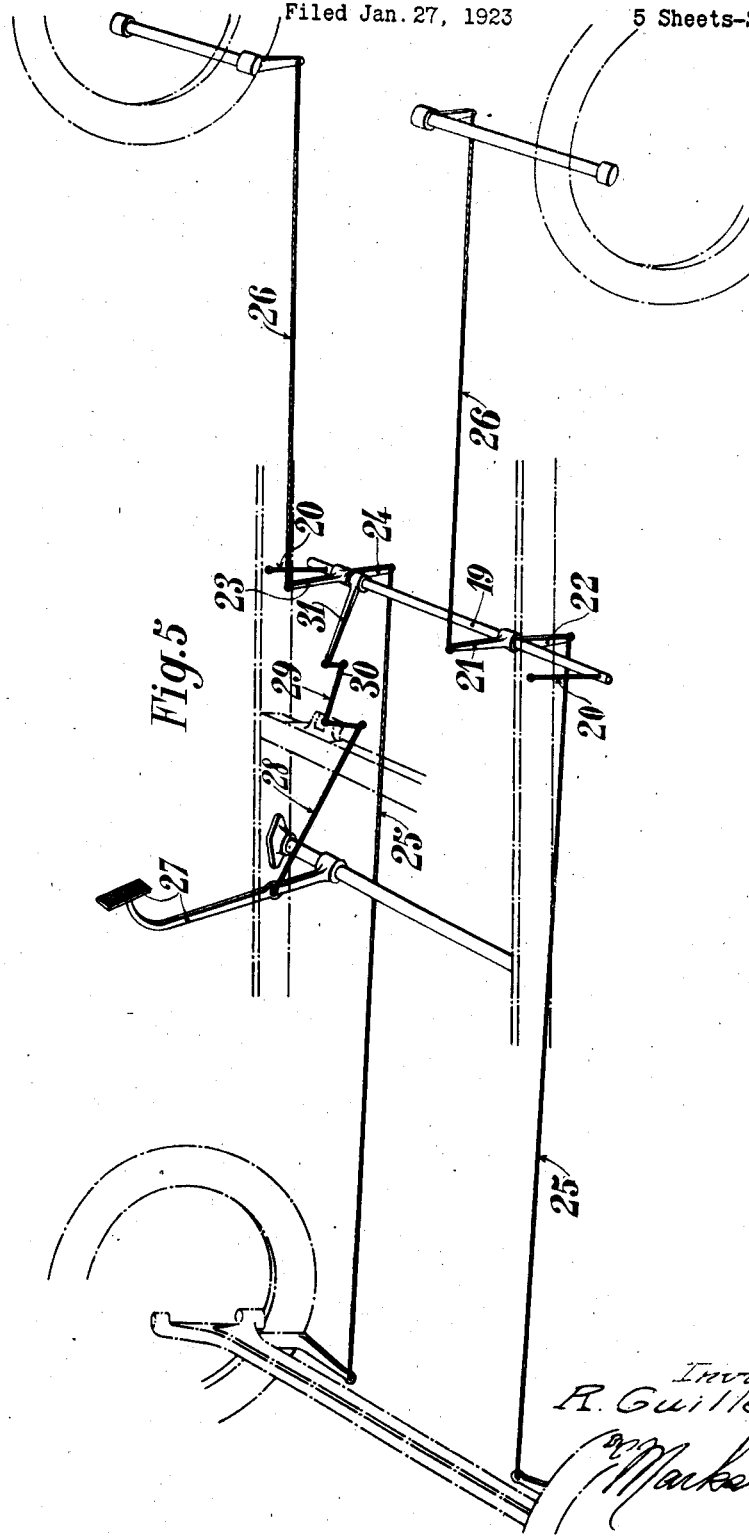

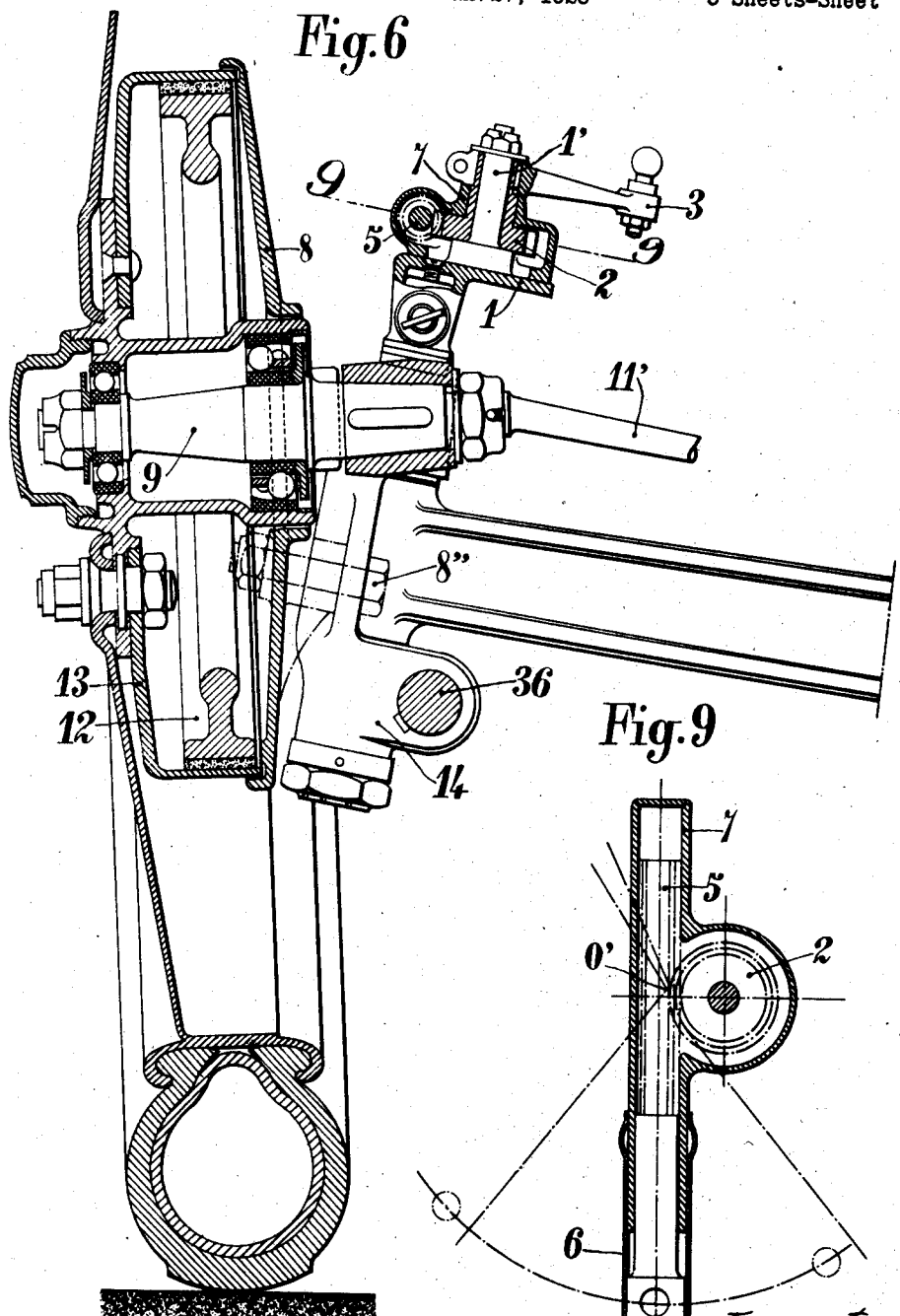
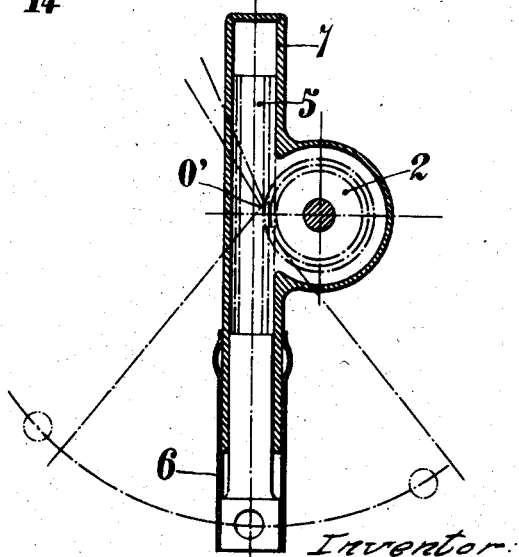

Patented May 1, 1928.

1,668,274

UNITED STATES PATENT OFFICE.

RENÉ GUILLERY, OF PARIS, FRANCE, ASSIGNOR TO ETABLISSEMENTS MALICET & BLIN, OF AUBERVILLIERS, FRANCE.

BRAKE.

Application filed January 27, 1923, Serial No. 615,262, and in France January 30, 1922.

The present invention relates to a braking device for the running truck of a vehicle, characterized by the combination, with a special system of brake gear or brake rigging, of a braking device for the steering wheels, permitting a differential braking on these latter during turning of the vehicle and uniformly distributing the stresses exerted on the elements of the brake gear ensuring the simultaneous braking of the four wheels of the vehicle.

The brakes of the nonsteering wheels can be of any known type, while the brakes on the steering wheels constitute a special device the control of which is combined with that of the brakes on the nonsteering wheels by a brake gear provided with a suspended rocking bar uniformly distributing on all the parts to be controlled, the stress exerted on a single operating member.

The accompanying drawing illustrates by way of example two forms of carrying out the braking device forming the subject-matter of the invention.

Fig. 1 is a diagram illustrating the kinematic principle according to which the braking device for the steering wheels operates.

Fig. 1ᵃ is a diagrammatic view of the modification of the invention.

Fig. 2 shows in elevation, with partial cross sections, a steering wheel provided with its braking device in accordance with the invention.

Fig. 3 is a vertical section according to lines 3—3—3 of Fig. 2.

Fig. 4 is a horizontal section according to line 4—4 of Fig. 2.

Fig. 5 is a perspective view showing the brake gear as used for the control of the brakes on the four wheels of a motor vehicle.

Fig. 6 shows in front view a constructional modification of the braking device for the front wheels.

Fig. 9 is a partial horizontal section according to 9—9 of Fig. 6.

Figure 7:
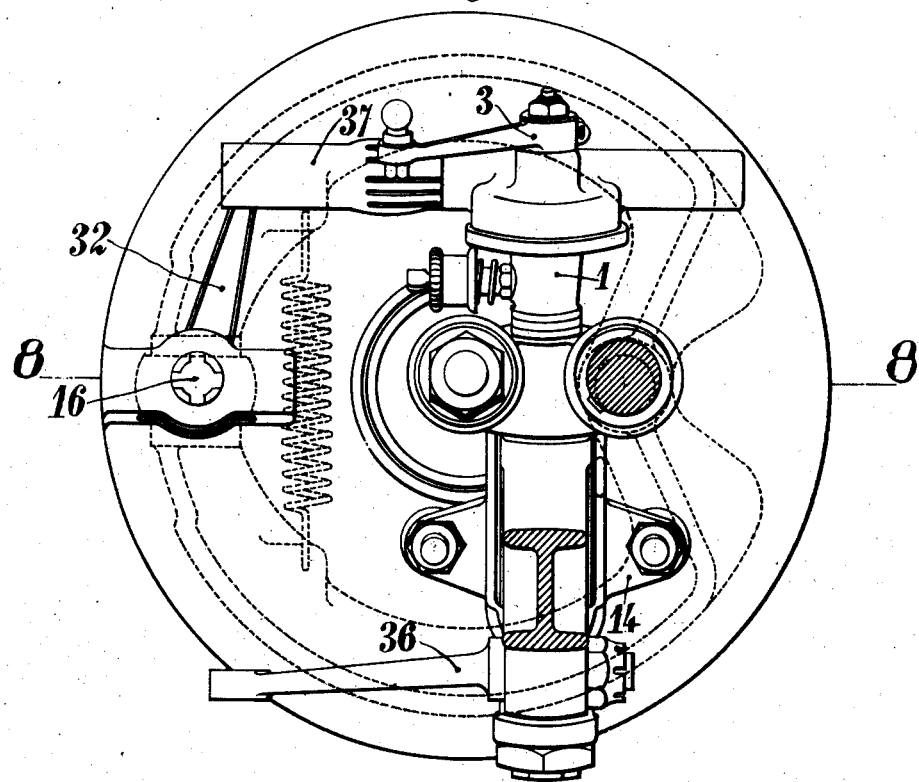
Fig. 7 is a side view corresponding to Fig. 6.

The braking device for the steering wheels rests on the kinematic principle illustrated in Fig. 1.

If it is considered that an involute arc $a\,b\,c$ generated from a circle having a center $o$, and that the tangents $a\,x$ and $c\,y$ subtend an angle less than 60° then the circular arc having a center $o'$ passing through $a\,b\,c$ does not sensibly differ from the involute arc.

From the foregoing it results, if the axis of rotation of the wheel at an angle to the axle is at the point $o'$, and the center $o$ be fixed relative to the axle at a slight distance from the point $o'$, the distances of the points $a$ and $c$ from the point $o$ will not materially change in the movement of the wheel, and will not due to this fact either materially increase or decrease the brake action which is not desired by the conductor or driver.

The circle having $o$ for center, being the pitch circle of a gear and the straight line $a\,x$ being for instance a rack, it will be possible to control the braking member by causing the gear to rotate whatever may be the position of the wheel.

In practice, the axis of oscillation of the steering wheel to be braked will pass through the point $o'$ corresponding to the position of the advancement of the vehicle on the road, if in a straight line, that is to say when the hubs of the wheels are in a plane parallel to the axle. But it will be understood that if such advancement is in a curved path by reason of oscillation of the wheel on the axis $o'$, it is possible to obtain a differential braking on the curves such that the braking action is more intense on the wheel which describes the inner curve.

Figs. 2, 3, 4, illustrate a first form of carrying out the principle which has just been set forth. The braking device for the steering wheels comprises a support 1 secured on the front axle in any suitable manner; in a fork piece of this support is held the gear 2 controlled from the exterior by the lever 3 engaging with its axis and constantly brought back by the spring 4. A rack 5 gears with the pinion 2 and is guided in a gear case in two parts 6 and the end bearing 7 of which extends in an orifice in the cheek 8. This cheek 8 carries the axis 9 of the wheel 10, the levers of the steering control and the fixed axis 11 about which are pivoted the jaws 12 which ensure the braking by bearing on the inner surface of the drum 13 integral with the wheel 10. This cheek 8 is moreover made in one piece with the bearing 14 of the pivot 15 about which moves the front wheel 10.

As already indicated, the axis of the pivot 15 passes through the point $o'$, at a certain distance from the axis $o$ of the pinion 2, in proximity to the pitch circle of the latter.

The portion of the rack 5 within the brake drum 13 is terminated by a fork piece 16 carrying two rollers 17 resting on bearings 18 terminating the brake jaws 12; these bearings 18 are inclined relatively to the axis of the rack so that a longitudinal sliding movement of the latter, determined by a rotation of the pinion 2, causes the spacing apart of the jaws 12 and, consequently their bearing on the inner surface of the brake drum.

The rotation of the pinion 2 is ensured by the angular displacement of the lever 3. It will be seen that the angular displacement of the steering wheels about their respective pivots 15 do not change the position of the point of contact of each of the rollers 17 with the bearings 18 of the brake jaws 12, that is to say do not exert any action on the braking, which is exclusively controlled by the lever 3.

However, the position of the point $o'$ can be so chosen that, in a curve, the braking is more intense on the wheel which is internal relatively to the curve than on the other wheel. In other words, a differential braking can be exerted, resulting from a determined position of the evolvent, described by the end of the member engaging the brake jaws, relatively to the pivoting center of the braked steering wheel. According as the latter is set inwardly or outwardly, one and the same displacement of the operating member controlling the brake gear determines a greater or less relative displacement of the rollers and engaged surfaces of the jaws.

Referring to Figure 1ᵃ, it will be seen that when the steering wheels are movable through a sector of about 90°, that is when they can pass through a sector of 45° in each direction, the point 16 of the toothed rack 5 strikes an arc of evolvent $c$ which does not differ substantially from an arc of a circle $d$ struck from the point $o'$ as center. This case, which is that in which the point $o'$ is the pivot of a steering wheel, shows that whatever the angular position of the steering wheels about the point $o'$, there is no relative movement of the fork piece 16 relatively to the surfaces 18 of the brake jaws (Figure 4) which means that no braking is produced. If the position of the point $o'$ is at $o''$, when the steering wheels are set for passing a curve, the point of the surfaces 18 of the brake jaws, which was originally in contact with the fork piece 16, describes a circumference $d'$ which is clearly different from the evolvent $c$. The result is that without any angular movement of the pinions 2, the fork piece 16 has been subjected relatively to the surfaces 18, to a displacement $e—f$ or $g—h$ according to the direction of lock of the steering wheels.

Assuming that the steering wheels be moved in the direction of the arrows $i$, the fork piece 16 (left side of Figure 1ᵃ) will have moved in the direction of its action on the surfaces 18 of the brake jaws to the extent $e—f$, while the fork piece 16 (right side of Figure 1ᵃ) will have moved to the same extent $e—f$ but in the opposite direction to its direction of action on the brake jaws. The wheel (left side of Figure 1ᵃ) is the inner wheel relatively to the curve (if the vehicle moves according to the arrow $j$) and it will be understood that for the same angular displacement of the pinions 2 under the action of the control of the brakes, the braking will be stronger on the left wheel than on the right wheel. The same applies to a lock of the wheels in an opposite direction to that of the arrows $i$, the movement to be considered being in this case the movements $g—h$. It must be understood that the dead stroke of the jaws, that is their possible movement without contacting with the brake drums, is sufficiently great to prevent the relative movements $e—f$ or $g—h$ from bringing about an inopportune braking, the braking being produced solely as desired by the driver by the angular movement of the pinions 2. In other words, the movement of the point $o'$ within $o''$ alters the periods of time within which commence the respective brakings of the steering wheels for the same angular movement of the pinions 2.

This particularity which is derived from the diagrammatic principle illustrated in Fig. 1 and resulting from the position of the arc of evolvent described by the rollers 17, relatively to the circumference the center of which is on the axis of the pivot 15 and passes through these rollers 17, constitutes one of the essential characteristics features of the invention. But it is to be understood that by the expression initial position of the point $o'$, is meant the position of this latter when the steering wheels are set for determining the movement of the car according to a straight line.

Figure 8:
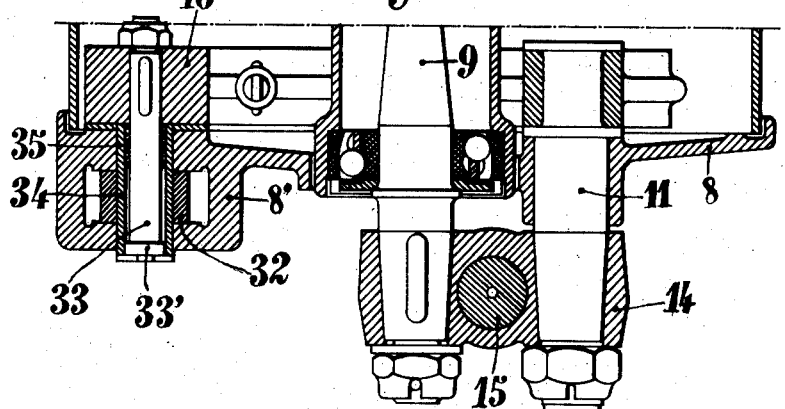
Fig. 8 is a horizontal section according to 8—8 of Fig. 7.

In the form of construction illustrated in Figs. 6 to 9, the key 16 acting on the brake jaws 12, rotates about an axis connected by a lever to the rack, as will be explained hereafter.

On the axis of the steering pivot and at its upper end, is rigidly mounted a member 1, forming a projection relatively to the support 14; from this fact, this member is always in a stationary position relative to the axle body. This member 1 carries an axis 1' on which is centered a gear 2 the hub or boss of which is engaged by a lever 3 connected to the brake gear. A casing 7 covering the gear 2 and capable of freely pivoting about the axis 1, supports the circular rack 5 constantly in gear with the pinion 2. The end of the front extension of this rack 5 is connected by a ball joint to the end of the lever 32; a dust-protector 37 protects the rack 5 against the projections of mud.

The support 14 is preferably made of stamped steel and of such pattern as to be indifferently suitable for the right-hand wheel or the left-hand wheel; it carries, on the one hand, the swivel 9 of the wheel and, on the other hand, the pivot 11 of the braking jaws 12. This pivot 11, which is extended for the wheel situated on the side of the steering gear, constitutes the lever 11′ engaging with the steering control the small sides 36 of which are connected by the coupling bar.

The control of the key or cam 16 is effected in the following manner:

The lever 32 is keyed at the end of the socket 34 rotating in a support 8′ cast in one piece with the dust-protector 8, secured by bolts 8″ on the support 14 and by adjustment on the cylindrical body of the pivot 11 of the jaws. The socket 34 drives, in its angular displacements, the cam-carrying axis 33 by a tenon and notch connection arranged at 33′ and permitting a slight floating of the axis 33 relatively to the socket 34. This floating is permitted by the use of a rubber ring 35 which, whilst normally ensuring the centering of the axis 33 can be subjected to slight distortions. This arrangement is adapted to preserve the cheek 8 from the reactions entering in action on the cam 16, upon braking and to transfer them on the fixed pivot 11 of the jaws 12.

In the form of construction of Figs. 1 to 4, an angular displacement of the plane of the wheel about its pivot has no action on the braking, other than that resulting from the slight displacement of the point of contact o′ (Fig. 4) of the rack 5 with the pinion 2, action which causes, as explained, an accentuation of the braking on the wheel which is situated inwardly relatively to the curve.

The brake gear which determines the simultaneous control of the braking on the four wheels and which uniformly distributes the reaction exerted in the control member is illustrated in Fig. 5. This brake gear comprises a rocking bar 19 transversely arranged to the frame of the car and suspended to this frame by two links 20 the two ends of which are ball-jointed. This rocking bar is integral with two levers 21—22 and 23—24 to the ends of which are attached the links 25 and 26 of the front and rear brakes. The operating member for the brakes is, for instance, a pedal 27 which acts through a link or rod 28 on the bell crank lever 29 one of the arms of which engages, through the pulling link 30, with the lever 31 integral with the rocking bar 19.

The lever 31 is horizontally arranged so that the torsion torque transmitted to the rocking bar may act alone by traction on the links 25 and 26 through the levers 21—22, 23—24 and that the stress exerted on the lever 31 is supported by the links 20. This lever 31 might be placed in another position, but in this case its action on the links should be taken in account.

This device constitutes an automatic balancing of the action of the brakes, as these latter are combined and the oscillation of the rocking-bar suitably distributes the stresses on the four links.

What I claim as my invention and desire to secure by Letters Patent is:

1. In a brake mechanism for front wheels of an automobile vehicle, the combination, an axle, a wheel thereon, a brake drum fixed on the wheel, brake jaws inside said drum, a cam to separate said jaws, a rack, means to connect said cam with said rack, a casing including a slide guide for said rack, an axis maintained in a position stationary with respect to the axle and serving as a pivot for said casing, a pinion mounted so as to rotate concentrically with said axis and constantly engaged with said rack, the pivot axis of the wheel and the point of contact of the teeth of the rack and pinion being substantially identical when the wheels are parallel with the body of the car, and means for displacing said pinion angularly.

2. In a driving mechanism for the actuating cam of the brake-shoes on the front wheel of an automobile, a rod kinematically connected with the actuating cam, an axis casing pivoted on the axis, a slide guide in said casing for said rod, a pinion rotatably mounted on the axis and arranged concentrically with respect to the pivot of said casing, a plurality of teeth forming a rack on said rod, and constantly in engagement with said pinion the pivot axis of the wheel and the point of contact of the teeth of the rack and pinion being substantially identical when the wheels are parallel with the body of the car, and means for displacing said pinion angularly.

In testimony whereof I have signed my name to this specification.

RENÉ GUILLERY.